United States Patent [19]

Hamada et al.

[11] Patent Number: 4,874,427
[45] Date of Patent: Oct. 17, 1989

[54] METHODS FOR MELTING AND REFINING A POWDERY ORE CONTAINING METAL OXIDES

[75] Inventors: Takao Hamada; Nobuo Tsuchiya; Toshihiro Inatani, all of Chiba; Eiji Katayama; Toshimitsu Koitabashi, both of Ichihara; Kyoji Okabe; Mitsuo Sumito, both of Chiba; Yoshiyasu Takada, Chiba, all of Japan

[73] Assignee: Kawasaki Steel Corporation, Kobe City, Japan

[21] Appl. No.: 127,600

[22] Filed: Dec. 2, 1987

Related U.S. Application Data

[63] Continuation of Ser. No. 646,028, Aug. 29, 1984, abandoned, which is a continuation of Ser. No. 371,677, Apr. 26, 1982, abandoned.

[30] Foreign Application Priority Data

| Apr. 28, 1981 | [JP] | Japan | 56-63294 |
| May 8, 1981 | [JP] | Japan | 56-68110 |
| May 21, 1981 | [JP] | Japan | 56-75639 |
| Jul. 16, 1981 | [JP] | Japan | 56-111357 |

[51] Int. Cl.$^4$ .......................................... C21B 11/08
[52] U.S. Cl. ........................................ 75/26; 75/38; 75/40; 266/160
[58] Field of Search ............... 75/26, 38, 40; 266/160, 266/172, 175

[56] References Cited

U.S. PATENT DOCUMENTS

| 3,028,231 | 4/1962 | Klemantaski et al. | 75/38 |
| 3,936,296 | 2/1976 | Campbell | 75/26 |
| 4,212,452 | 7/1980 | Hsieh | 266/185 |
| 4,270,740 | 7/1981 | Sanzenbacher et al. | 266/162 |
| 4,448,402 | 5/1984 | Weber et al. | 75/38 |
| 4,504,043 | 3/1985 | Yamaoka et al. | 266/160 |

FOREIGN PATENT DOCUMENTS

| 964863 | 3/1975 | Canada . | |
| 927309 | 5/1963 | United Kingdom . | |
| 1451040 | 9/1976 | United Kingdom . | |
| 1485691 | 9/1977 | United Kingdom . | |
| 2084196 | 4/1982 | United Kingdom | 75/38 |

Primary Examiner—Melvyn J. Andrews
Attorney, Agent, or Firm—Balogh, Osann, Kramer, Dvorak, Genova & Traub

[57] ABSTRACT

A powdery or fine granular ore containing metal oxides is melted and refined by charging the ore and a part of a reducing gas discharged from a vertical type of melting and reducing furnace into a fluidized bed type of preliminary reducing furnace to preliminary reduce the ore therein, charging the preliminary reduced ore heated at a high temperature into the above described melting and reducing furnace and melting and reducing the ore by using a carbonaceous solid reducing agent and air or oxygen rich air heated at a high temperature and discharging the molten metal and the molten slag from the melting and reducing furnace. By using the preliminary reduction step, the pretreatment of the powdery or fine granular ore containing metal oxides, such as formation into pellets, sintered ores, briquets and the like can be omitted.

7 Claims, 4 Drawing Sheets

METHODS FOR MELTING AND REFINING A POWDERY ORE CONTAINING METAL OXIDES

This application is a continuation of application Ser. No. 646,028 filed Aug. 29, 1984, abandoned, which is a continuation of U.S. Ser. No. 371,677 filed Apr. 26, 1982, abandoned.

BACKGROUND OF THE INVENTION

The present invention relates to methods for melting and refining a powdery or fine granular ore containing metal oxides by preliminarily reducing the ore and then melting and reducing the preliminarily reduced ore and apparatuses for melt-refining the ore and particularly to methods for melting and refining the ore by preliminarily reducing the ore by means of a reducing gas generated upon the melting and reducing the ore and then melting and reducing (referred to as "melt-reducing" hereinafter) the preliminarily reduced ore and apparatuses for melt-refining the ore.

There has been a long-felt need to develop novel methods for refining an iron ore or a metal oxide ore. Various methods have been tried and practically carried out. However, most of them had severe drawbacks.

Concerning the form of ores containing iron oxide or various metal oxides, there is a tendency that the lump ore is reduced and the powdery ore is increased. In particular, in order to improve the quality of low grade ores, mineral processings, such as magnetic separation, floatation and the like have been carried out and it is expected that the ratio of powdery ores is more increased in future. A major part of the presently operating refining furnaces needs lump ores or previously treated lump ores and powdery ores are formed into pellets, sintered ores, briquets, and the like. Such a formation needs superfluous materials, such as solvents, binders, etc., fuels and motive powers. When a firing furnace is used for such a formation during the hot step, NOx, SOx and dusts are generally formed and if these substances are directly discharged, a problem of environmental pollution occurs, so that installations for preventing the environmental pollution are built but this needs a large cost.

As a technique capable of directly using powdery ore, a roasting or a reducing process using a fluidized bed is partially practically used. However, when the preliminarily reduced powdery ore is used in an electric furnace, a converter and other melting furnaces, in most case, a binder is added thereto and the mixture is formed into briquets and the like. It has been proposed that the powdery ore be used in a process utilizing an arc furnace or plasma but the amount of electric power consumed in such process is very large and in countries where the electric power cost is high (as in Japan), this process would not be cost effective or competitive enough.

As a means for supplying the heat energy necessary for the reduction and heating, there is a means utilizing combustion heat wherein coke is burnt by using mainly air without using electric power or pure oxygen and a blast furnace for refining iron, nickel, copper, etc. uses this process. In particular, it has been well known that the iron making blast furnace is very high in efficiency as a refining furnace due to operative technical progress and by enlarging the size of furnace. But the iron making blast furnace is a high shaft furnace and in order to ensure the air permeability in the furnace, the above described lump ores or the lump formed ores are necessary and further the lump ores and coke are piled in layer-form in the furnace, so that coke having a high strength is needed. For the production of the coke having a high strength, a high caking coal having a high price, which presumably becomes insufficient in the future in view of the resources as the starting coal is necessary or when a low caking coal or a usual coal is used, an improving binder is necessary and the production cost is increased.

It has been proposed in Japanese patent application publication No. 2,103/59 or Japanese patent laid-open application No. 142,313/79 that the powdery preliminarily reduced ore prepared by preliminarily reducing powdery ore is melted and reduced in the powdery state and in the former process, a burning assistant for burning a fuel is a gas containing more than 85% of oxygen and in the latter process, the assistant is pure oxygen. In order to maintain the molten metal pool in the melt-reducing furnace at a high temperature, in the former process, a gas having $CO_2/CO$ ratio of 1 which has an oxidizing function against Fe is evolved through a reaction of coal with oxygen, and in the latter process, carbon attached to the preliminarily reduced ore is burnt with pure oxygen. Furthermore, in the former process, the gas is oxidizing, so that iron oxide is apt to be formed into slag in unreduced state and discharged out of the furnace, and in the latter process, the unevenness of the temperature in the combustion furnace and the unevenness of the oxygen partial pressure are apt to be caused, so that the settlement of the operating condition in the melting furnace is difficult.

SUMMARY OF THE INVENTION

The present invention aims to provide an improved production method wherein various drawbacks, encounted in the previously proposed methods for producing a molten metal from a powdery ore containing metal oxides, are obviated.

The present invention lies in methods for melting and reducing a powdery ore containing metal oxides including preliminarily reducing a powdery or fine granular ore containing metal oxides in a fluidized bed type of preliminary reducing furnace by feeding a part of a reducing gas discharged from a vertical type of a melting and reducing furnace into the preliminary reducing furnace, charging the preliminarily reduced ore into the above described melting and reducing furnace (referred to as "melt-reducing furnace" hereinafter) at a high temperature and melting and reducing the ore by using a carbonaceous solid reducing agent and air or oxygen rich air heated at a high temperature to melt and reduce the ore and discharging the molten metal and the molten slag from the melt-reducing furnace.

DESCRIPTION OF THE PREFERRED EMBODIMENTS

A first aspect of the present invention will be explained in detail hereinafter.

According to the present invention, a packed bed composed of a carbonaceous solid reducing agent is provided in the melt-reducing furnace, a preheated air or a preheated air added with oxygen is blown to the packed bed from tuyeres and in this case a preliminarily reduced powdery or fine granular ore and a flux or a mixture of powdery or fine granular ore and powdery flux which has been subjected to preliminary reduction are concurrently carried on the gas flow and blown into the furnace from the tuyeres, the charged mixture is melted at highly heated zones caused at the circumference of the tuyere top end portions and the molten ore is reduced when the molten ore is dropped down through the above described packed bed and the molten metal is collected together with the molten slag in a bottom floor of the melt-reducing furnace and timely discharged out of the furnace. The above described preliminarily reduced ore is obtained by preliminary reduction using a reducing gas discharged from the melt-reducing furnace. The above described flux serves to develop the function of a melt-promoting agent or a desulfurizing agent upon the melt-reduction and as the flux, use may be made of limestone, silica, dolomite, surpentine, etc. according to the property of the ore.

An embodiment carrying out the present invention will be explained with reference to FIG. 1.

Powdery or fine granular metal oxide is fed from a feeder 1 to a preliminary reducing furnace 2. A part or the whole of a gas heated at a high temperature, which is discharged from a vertical melt-reducing furnace 3 through a gas outlet 4 is introduced into the preliminary reducing furnace 2 through a gas inlet 5 in the preliminary reducing furnace 2 and dries, heats and preliminarily reduces the metal oxide charged in the preliminary reducing furnace by a fluidized system. Thus preliminarily reduced ore is discharged from an outlet 6 and blown into a vertical furnace 3 together with preheated air through a pipe 7 shown by a dotted line and tuyeres 8 and/or 8'. In this case, in order to make the transfer of the preliminarily reduced ore in the pipe 7 easy, it is advantageous to use a part of the gas discharged from the vertical furnace 3 after the pressure of the gas is raised by means of a pressurizing device 9, as a carrier gas. The heated air (referred to as "hot air" hereinafter) blown into the vertical furnace 3 is heated to 800°–1,300° C. in a gas heating furnace 10. Oxygen gas may be blown together with the hot air. Furthermore, a flux may be blown together with the preliminarily reduced ore into the vertical furnace 3 through the tuyere by the hot air in order to advantageously effect the melt-reducing refining.

Into the vertical furnace 3 is fed a reducing agent through a feeding device 11 of a carbonaceous solid reducing agent and a reducing agent packed bed is formed in the furnace 3 and raceways are formed owing to the hot air in the vicinity of the tuyere tops in the furnace 3 in the same manner as in the vicinity of the tuyere top of a blast furnace and high temperature zones at 2,000°–2,500° C. are formed and the preliminarily reduced ore blown together with the hot air or oxygen to be added into these zones is immediately heated and easily melted. The melted ore is reduced during dropping down in a lower portion of the furnace 3 to form a molten metal and a molten slag and to effect the refining and the refined metal is collected in the furnace bottom portion and timely discharged out of the furnace from a taphole 12.

The circumference of the above described raceway portions forming the high temperature zone is the packed bed consisting of lump carbonaceous reducing agent and the gas at the circumference of the raceway portions is low in the oxygen content, that is the oxygen partial pressure is low, so that the reduction of the preliminarily reduced ore which is melted at the raceway portions in the furnace 3 is very preferably carried out.

In the present invention, as the carbonaceous solid reducing agent, use may be made of lump coke, lump char or coal alone or in admixture. The height of the vertical furnace 3 may be made lower than that of a usual blast furnace and the preliminarily reduced ore is supplied into the furnace 3 from the tuyeres, so that the reducing agent having high strength as in a blast furnace is not needed and therefore expensive caking coal is not needed and this is commercially advantageous.

In the present invention, the preliminarily reduced ore is once oxidized by oxygen in the hot air in the raceway portions and heated and melted due to the reaction heat, so that the reduction ratio is high and the use of the preliminarily reduced ore at a high temperature renders the melting easy and the present invention is advantageous in this point. The preliminary reduction ratio is varied depending upon the kind of ore and the like but the best results can be obtained within the range of 40–80%.

According to the present invention, in order that the preheated and preliminarily reduced ore blown into the furnace together with the hot air through the tuyere is melted and reduced near the tuyere top, a large heat energy is necessary and even if the ore is melted in the vicinity of the tuyere top, when the heat supplement at the lower portion of the furnace is insufficient, the reduction of the molten ore is not satisfactorily caused and the operation becomes impossible due to cooling down of the furnace floor, so that in order to prevent this cooling down, the tuyeres must be provided at the upper and lower two stages. In this case, the preliminarily reduced ore is mainly fed from a tuyere 8 positioned at the upper stage and melted in the vicinity of the tuyere top in the upper stage and the lower portion of the furnace is heated to a high temperature by the tuyere 8' in the lower stage and the heat energy necessary for reducing the molten ore dropped down from the vicinity of the tuyere top 8 in the upper stage is supplied.

This invention will be explained with reference to FIG. 2.

A powdery carbonaceous reducing agent is fed into the preliminary treating furnace 32 from a device 31 for feeding the carbonaceous solid reducing agent and a part or the whole of gas generated in a vertical reducing furnace 33 is introduced into the preliminary treating furnace 32 through an outlet 34 and a pipe 35 and the reducing agent is dried and heated while being fluidized in the preliminary treating furnace 32 to effect the preliminary treatment by which the reducing agent is heated or carbonized to a necessary extent. For example, when powdery coal is used, the above described coal is subjected to carbonization through the preliminary treatment in the preliminary treating furnace 32 to prepare powdery cokes or char, which is discharged from the above described furnace 32.

The powdery carbonaceous reducing agent may be directly fed into the vertical reducing furnace 33 without using the preliminary treating furnace 32 but when carbonized gas containing hydrocarbons or tar is necessary in the preliminary reducing furnace and other installations or the above described reducing agent must be preheated in order to make the burning of the powdery carbonaceous solid reducing agent in the vertical reducing furnace easy, it is particularly advantageous to preliminarily treat the reducing agent in the preliminary treating furnace 32.

On the other hand, powdery ore containing metal oxides is fed into the preliminary treating furnace 37 from an ore feeding device 36 and a part or the whole of gas generated from the vertical reducing furnace 33 and/or a part or the whole of the gas generated from the preliminary treating furnace 32 are fed into the furnace 37 through pipes 38 and 39 and the above described powdery ore is dried and heated while being fluidized in the furnace 37 and preliminarily reduced to the desired extent. The gas generated from the vertical reducing furnace 33 includes $N_2$, $CO$, $CO_2$, $H_2$, $H_2O$ and the like and among them, the content of the reducing $CO$ and $H_2$ is high and the gas is discharged at a high temperature of 900°–1,500° C. from the vertical furnace 33 and the gas generated from the preliminary treating furnace 32, when coal is the starting material, includes $N_2$, $CO$, $CO_2$, $H_2$, $H_2O$, $C_nH_m$ (meaning hydrocarbons) and the like and among them, the content of the reducing $CO$, $H_2$ or $C_nH_m$ is high and the gas is discharged at a temperature of 300°–800° C. from the outlet 32a of the preliminary treating furnace 32. Accordingly, the powdery ore is preliminarily reduced while being fluidized in the preliminary reducing furnace 37. The preliminarily reduced ore is discharged under a highly heated condition from the preliminary reducing furnace 37 by means of a discharging device 40 and is transferred to at least one of preliminarily reduced ore feeding devices 42, 43 and 44 through a guide device 41 with a flux being added on the way if necessary and charged into the vertical reducing furnace 33. The preliminarily reduced ore is transferred with gas to the feeding devices 43 and 44 and as the carrying gas, use is made of the gas generated from the vertical reducing furnace 33 and in some case, it is advantageous to pressurize the above described carrying gas by means of a pressurizing device 45, because the transfer of the preliminarily reduced product with gas is made easy.

The carbonaceous reducing agent treated in the preliminary treating furnace 32 is discharged from an outlet 46 and if necessary, pressurized by means of a pressurizing device 47a through a guide device 47 and fed into the vertical reducing furnace 33 through at least one of feeding devices 48, 49 and 50 and reacted with an oxygen-containing gas having a high temperature, which is supplied from inlets 51 and burnt therein, or contacted with metal oxides in the preliminarily reduced ore, which has been fed into the vertical reducing furnace 33 and melted therein, whereby the metal oxide is reduced to form the metal.

As the oxygen-containing gas having a high temperature, use may be made of air or oxygen rich air which is heated to a temperature of 800°–1,300° C. by means of a gas heating furnace 52, such as a hot air furnace.

Powdery carbonaceous solid reducing agent or powdery carbonaceous solid reducing agent treated in the preliminary treating furnace is burnt with the oxygen-containing gas at a high temperature at an upper zone above the position of the top of the tuyere-shaped feeding device 50 in the furnace 33, to evolve a high temperature and therefore the preliminarily reduced ore is heated, melted and reduced in the high temperature zone to form a molten metal and a molten slag, which are collected in two layers at the lower portion of the vertical reducing furnace 33 and the molten metal is timely discharged out of the furnace from an outlet 53.

In the present invention, as carbonaceous solid reducing agent supplied to the preliminary treating furnace 32, use may be made of powdery coke, char and coal alone or in admixture and when coal is used, inexpensive non-caking usual coal can be advantageously used and when lump coke is used, powdery cokes prepared in the production of lump cokes can be advantageously used.

It is necessary that the preliminarily reduced powdery ore supplied to the vertical reducing furnace 33 is quickly melted and reduced in the high temperature zone in the vertical reducing furnace 33, so that it is advantageous because the melt-reduction is easily effected, that the preliminarily reduced ore, which has been preheated to a high temperature and reduced to a high reduction ratio, is fed into the vertical reducing furnace 33. The optimum preheating temperature and preliminary reduction ratio naturally vary depending upon the kind of metal oxides, the state of ore containing metal oxide and the used system construction but when the preheating temperature and the preliminary reduction ratio are about 400°–1,000° C. and 40–80% respectively, the good results can be obtained.

According to the present invention, an oxygen-containing gas having a high temperature of 800°–1,300° C. is blown into the vertical reducing furnace 33 through a tuyere 51, so that a circumference of an inner end of a tuyere-formed feeding device 50 is heated to a temperature of 2,000°–2,500° C. The shape of the tuyere 51 may be made similar to the shape of tuyere of an iron making blast furnace but in order to maintain the temperature of the molten metal pool portion at the furnace floor at 1,400°–1,700° C., it is desirable that an inclined angle of the tuyere 51 projecting into the furnace is within a range to 45° downwardly from the horizontal so that the high temperature gas directly contacts with the above described molten metal pool portion.

In order to maintain the vicinity of the inner end of the feeding device 50 at a high temperature of 2,000°–2,500° C., an excess amount of oxygen should be supplied to the vicinity from the tuyere 51 as an oxygen-containing gas having a high temperature. However, the high temperature is kept thereby and concurrently the oxygen pressure in this vicinity is increased and therefore a reoxidation of the molten preliminarily reduced ore occurs and a concentration of iron oxide contained in the discharged slag increases and this is not desirable in view of the reduction. In order to avoid such disadvantage, it is possible to maintain the vicinity of the inner top of the feeding device at a high temperature and in a reducing atmosphere by directly supplying the powdery reducing agent on the molten slag surface from the feeding device 50 positioning below the tuyere 51 for feeding the oxygen-containing gas having a high temperature.

Then, a detailed explanation will be made with respect to the second aspect of the present invention.

According to the present invention, powdery ore is fed into an upper zone which is formed by defining a vertical furnace by a perforated plate into the upper and lower zones. A reducing gas formed in the lower zone rises into the upper zone through the perforated plate and the powdery ore is dried, heated and reduced while being fluidized with this gas to a necessary degree. The reducing gas generated in the lower zone may rise in a part or the whole into the upper zone through the perforated plate, or in a certain case, the reducing gas or an inert gas may be supplied to the vicinity below the perforated plate in the lower zone from the outside to control the fluidized state of the ore or the temperature, component composition and the like of the fluidizing gas in the upper zone.

The gas generated in the lower zone includes $N_2$, CO, $CO_2$, $H_2$, $H_2O$, $C_mH_n$, etc. and among them the content of gas having a high reducibility, such as CO, $H_2$, $C_mH_n$, etc. is high and the temperature is 600°-1,200° C. and this gas is introduced into the upper zone through the perforated plate. The ore which has been subjected to the fluidizing preliminary reduction in the upper zone, is overflowed and discharged at a high temperature from an outlet provided in the upper zone from the upper zone and blown into a carbonaceous material filled bed formed in the lower zone by adding a flux together with air or oxygen rich air heated at a high temperature through upper tuyeres provided in the lower zone. The above described air or oxygen rich air is heated at a temperature of 800°-1,350° C. in a gas heating furnace, such as a hot air furnace. Air or oxygen rich air having a high temperature is blown also from the lower tuyeres. At the vicinity of the top ends of the upper and lower tuyeres, the carbonaceous material forming the packed bed is burnt and a high temperature is evolved, so that the above described blown preliminarily reduced ore is heated and melted and directly reduced with solid carbonaceous material during dropping down in the packed bed to form a molten metal and a molten slag, which are collected at the bottom of the lower zone and the molten metal is timely discharged out of the vertical furnace.

As the carbonaceous material, lump coke is mainly used but lump coal, char, charcoal, etc. may be used alone or in combination.

In this invention, the height of the vertical furnace may be rendered lower than that of a usual iron making blast furnace and it is not necessary to charge lump cokes in layer alternately as in the iron making blast furnace, so that cokes having a high strength is not needed, so that expensive caking coal is not needed.

In the present invention, unless the preliminarily reduced ore fed from the upper tuyeres is rapidly melted at the vicinity of the tuyeres, the ore cannot be dropped down to the bottom portion in the lower zone and this causes an operating trouble but this trouble can be prevented by blowing air or oxygen rich air having a high temperature from the tuyere in the lower zone. The preliminarily reduced ore blown from the tuyeres is once oxidized with oxygen and the heating and melting are promoted owing to the reaction heat. Accordingly, as the preliminarily reduced ore is higher in the reduction ratio and in the preheating temperature, the melting becomes more easy. The optimum preliminary reduction ratio is naturally varied according to the kind of ore and the system construction but said ratio is preferred to be about 40-80%.

One embodiment for carrying out the present invention will be explained with respect to an apparatus shown in FIG. 3.

A vertical furnace 81 is defined by a perforated plate 83 into an upper zone and a lower zone. The upper zone is provided with a feeding device 62 for a powdery ore and a guide device 58 by which the powdery ore preliminarily reduced in the upper zone is overflowed and discharged in the fluidized state from the upper zone to the lower zne, and further an outlet 60 for the exhaust gas after the fluidizing reduction in a relatively upper portion in the upper zone is provided.

In the lower zone, there are provided a plurality of tuyeres 56 and 54 at an upper stage and a lower stage respectively and the tuyeres 56 in the upper stage are connected to the above described feeding device 58. At a zone just below the perforated plate 83 at a relatively upper portion of the lower zone, a device 55 for controlling a reducing gas generated in the lower zone may be provided, if necessary. A carbonaceous material feeding device 57 to the lower zone is provided and the lower portion of this feeding device 57 are branched in the upper zone and form branched tubes 59 and these branched tubes 59 penetrate the perforated plate 83 and are suspended in the lower zone. An outlet 61 discharging a molten metal and a molten slag is provided at the bottom of the lower zone.

Figure 4:
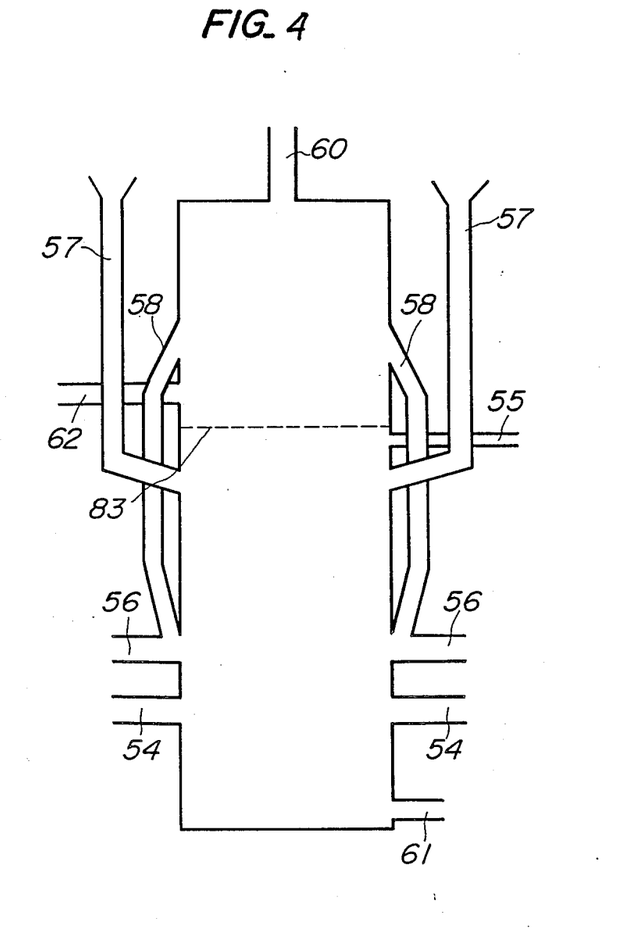
FIG. 4 is a schematic view showing the production system of another embodiment of the third aspect of the present invention.

FIG. 4 is an explanatory sectional view of an apparatus for carrying out another embodiment of the third aspect of the present invention.

Figure 3:
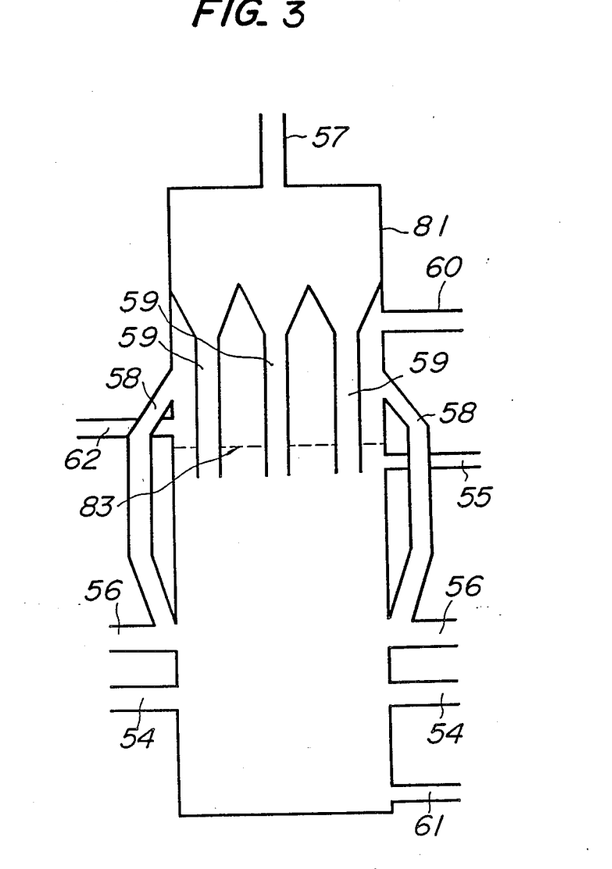
FIG. 3 is a schematic view showing the production system of one embodiment of the third aspect of the present invention.

The apparatus shown in FIG. 4 is different from that in FIG. 3 and the carbonaceous material feeding device 57 is not provided so that the feeding device penetrates the upper zone and the perforated plate 43 and are suspended, but the device 57 is provided so that the carbonaceous material is directly fed from an outside of the vertical furnace to the lower zone. Except for such feeding device 57, the other structure is quite the same in FIG. 3 and FIG. 4. According to the apparatus in FIG. 3, the carbonaceous material fed through the feeding device 57 is preheated during the passing through the upper zone, so that this is thermally advantageous but the structure of the feeding device 57 is somewhat complicated and said feeding device is exposed to a high temperature, so that the durability is lower than the apparatus shown in FIG. 4, while in FIG. 3, the feeding device 57 is not exposed to a high temperature, so that the durability is higher but the cold carbonaceous material is directly fed to the lower zone, so that this apparatus is more thermally disadvantageous than that shown in FIG. 3.

The apparatus of this embodiment is characterized in that the tuyeres are provided at an upper stage and a lower stage. Because a large heat energy is needed for melting the preliminarily reduced one and reducing oxygen in the ore, so that if the tuyeres at the lower stage are not provided, even though the preliminarily reduced ore is melted at the tuyere top of the upper stage, the zone below the tuyere level of the upper stage is low in the temperature, so that the reduction of the molten ore owing to the solid carbonaceous material is not satisfactorily caused and the operation cannot be continued due to cooling down of the furnace but according to the present invention, the cooling down of the lower portion of the furnace can be completely prevented by burning the carbonaceous material at the lower portion of the furnace.

The carbonization of the carbonaceous material effectively occurs at about 500° C. and the reaction efficiency lowers at a temperature lower than 500° C. The carbonization can be effected at a reaction temperature higher than 700° C. but tar component in the carbonaceous material volatilizes and becomes a gaseous state, so that in order to effectively recover tar in a liquid state by a separator, the temperature is preferred to be lower than 700° C. Because if the reaction temperature becomes higher than 700° C., the liquid component is decomposed and the conversion rate into hydrocarbon gas increases.

The volatile matter in a carbonaceous material, such as coal, when the carbonization is efected with the above described temperature range, evolves a carbonized gas containing tar, hydrogen, methane and the like and this gas is taken out from an outlet 65 in the upper chamber $A_1$ and a liquid tar is separated and recovered in a separator 66 and the remained exhaust gas is recovered through a purifying apparatus 67 including a desulfurizing apparatus. The recovered gas contains $H_2$, CO, $C_mH_n$ and the like and can be effectively utilized as a clean fuel gas, a reducing gas for ore, a starting gas to be used in chemical industry. Of course, this gas can be utilized as a source for heating air to a high temperature, which is supplied to the herein-after mentioned melt-reducing furnace. The recovered tar is subjected to another purifying treatment and is used as a starting material for chemical industry.

The following examples are given for the purpose of illustration of this invention and are not intended as limitations thereof.

The invention will be explained with respect to examples concerning the first aspect of the present invention.

EXAMPLE 1

Figure 1:
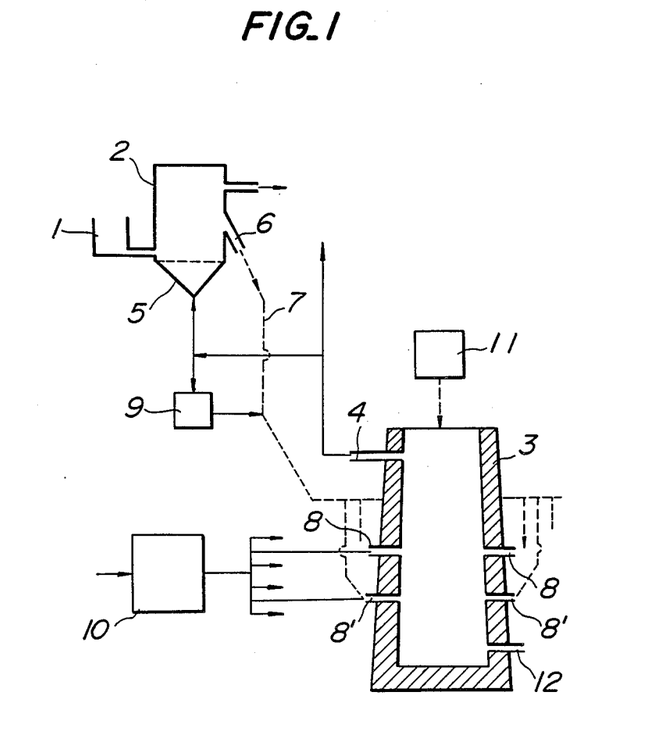
FIG. 1 is a schematic view showing the production system of one embodiment of the first aspect of the present invention.

This example was carried out following to the production system shown in FIG. 1.

| (1) | Iron ore | MBR ore |
|---|---|---|
| | Grain size | less than 2 mm |
| | Supplied amount | 1,650 kg/hr |
| (2) | Carbonaceous solid reducing agent | |
| | Kind | coke |
| | Grain size | 25–75 mm |
| | Supplied amount | 660 kg/hr |
| (3) | Amount of air blown into the vertical furnace | 1.500 Nm³/hr |
| | Blown air temperature | 900° C. |
| | Number of air blowing tuyeres | Total 8 |
| | In each of lower and upper stages (The preliminarily reduced product is fed into 4 tuyeres in the upper stage) | 4 |
| | Preliminary reduction ratio | 71% |
| (4) | Amount of pig iron produced | 1,100 kg/hr |
| (5) | Amount of slag formed | 220 kg/hr |

EXAMPLE 2

Figure 2:
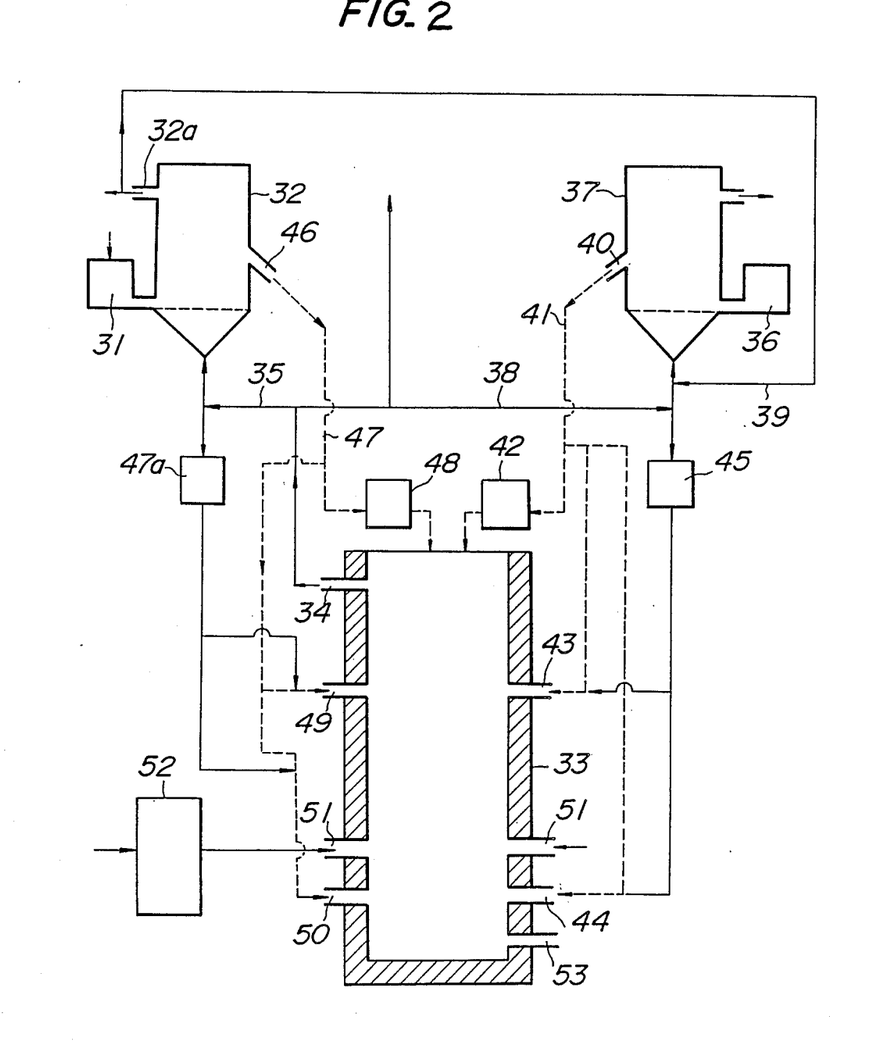
FIG. 2 is a schematic view showing the production system of one embodiment of the second aspect of the present invention.

The example was carried out following to the production system shown in FIG. 2.

| (1) | Iron ore | MBR ore |
|---|---|---|
| | Grain size | less than 2 mm |
| | Supplied amount | 2,610 kg/hr |
| (2) | Carbonaceous solid reducing agent fed into the preliminary treating furnace: | |
| | Kind | Non-caking coal (F.C.: 74.8%) |
| | Grain size | less than 3 mm |
| | Supplied amount | 1,110 kg/hr |
| (3) | Amount of air blown into the vertical reducing furnace | 2,350 Nm³/hr |

-continued

| | Blown air temperature | 900° C. |
|---|---|---|
| (4) | Preliminary reduction ratio | 71% |
| (5) | Amount of pig iron produced | 1,710 kg/hr |
| (6) | Amount of slag formed | 364 kg/hr |

The following merits are obtained in the first and the second aspects of the present invention.

(1) Since powdery ore can be directly used without effecting the lump form step, energy and expense for the lump formation are not necessary and no countermeasure for NOx, SOx and dusts formed in the lump formation is needed.

(2) The gas evolved in the vertical reducing furnace and the preliminary treating furnace is used as the gas for preliminarily reducing an ore, so that an equipment for preparing the reducing gas is not specifically provided.

(3) The preliminarily reduced ore having a reduction ratio of 40–80%, which can be relatively easily obtained, can be produced without hindrance.

(4) Inexpensive carbonaceous solid reducing agent can be used as a heat source and when non-caking coal powder is used, a gas containing hydrocarbons having a very high reducibility and tar can be obtained.

(5) The gas blown into the melt-reducing furnace is mainly the preheated air and expensive oxygen is not necessarily needed.

(6) The pretreatment, the preliminary reduction and the melt-reduction are carried out in the fluidized state, so that there is no limitation in the place where the preliminarily reduced ore is fed to the vertical reducing furnace and the melting and the reduction may be easily carried out.

As the example, use of iron ore was shown but nickel ore, manganese ore, chromium ore, etc. may be used as the starting material for carrying out the present invention.

With respect to an example concerning the third aspect of the present invention, an explanation will be made hereinafter.

EXAMPLE 3

This example was carried out following to the production system shown in FIG. 3.

| (1) | Iron ore | MBR ore |
|---|---|---|
| | Grain size | less than 2 mm |
| | Supplied amount | 3,499 kg/hr |
| (2) | Solid reducing agent. | |
| | Kind | cokes |
| | Grain size | average 45 mm |
| | Supplied amount | 1,488 kg/hr |
| (3) | Amount of air blown into the vertical furnace | 3,150 Nm³/hr |
| | Blown air temperature | 900° C. |
| (4) | Preliminary reduction ratio | 71% |
| (5) | Amount of pig iron produced | 2,299 kg/hr |
| (6) | Amount of slag formed | 488 kg/hr |

The following merits are obtained in the second aspect of the present invention.

(1) Powdery ore or metal oxide can be used without effecting the lump forming step, so that energy and auxiliary materials for the lump formation are not necessary and NOx, SOx and dusts resulting from the lump formation are not formed.

(2) The gas evolved from the coke packed bed can be used as the preliminary reducing gas, so that no equipment for preparing a reducing gas is needed.

(3) High preliminary reduction ratio is not needed, so that the preliminary reduction is easy and a high gas utility is attained.

(4) The preliminarily reduced ore or metal oxide is subjected to the melt-reduction as such, so that the lump formation, such as briquet is not necessary.

(5) In the melt-reduction, expensive electric power is not necessary and the sufficient heat energy can be supplied by combustion of the solid reducing agent with oxygen by using two stage of tuyeres.

(6) No coke having a high strength as in the iron making blast furnace is needed, so that expensive caking coal the source of which is few, is not necessary.

(7) By providing a fluidized bed on the upper portion of the coke packed bed, the sensible heat of gas evolved in the coke packed bed can be effectively utilized.

(8) The feeding of the preliminarily reduced product to the tuyeres of the upper stage adopts an overflow system from the upper portion of the fluidized bed, so that the feeding is very easy and the pressurizing of gas is not necessary.

What is claimed is:

1. In a method for melting and refining a powdery or fine granular ore containing metal oxide comprising
   (1) charging said ore and a reducing gas to a fluidized bed type of preliminary reducing furnace to preliminarily reduce said ore therein,
   (2) charging the preliminarily reduced ore heated at a high temperature into a vertical melting and reducing furnace,
   (3) introducing air or oxygen-enriched air at elevated temperature into said melting and reducing furnace so that said ore is melted and reduced therein by a carbonaceous solid reducing agent and air or oxygen-enriched air, and
   (4) discharging molten metal and molten slag from the melting and reducing furnace,
   the improvement which comprises
   generating a reducing gas at elevated temperature in a vertical melting and reducing furnace containing a carbonaceous reducing agent and provided with upper and lower tuyeres,
   blowing at least a part of said reducing gas, discharged from said melting and reducing furnace, into the preliminary reducing furnace to preliminarily reduce said ore therein, and
   introducing the preliminarily reduced ore into said melting and reducing furnace via at least the upper of the tuyeres and introducing air or oxygen-enriched air via at least the lower of the tuyeres.

2. A method in accordance with claim 1, wherein said air or oxygen-enriched air is introduced into said melting and reducing furnace at a temperature of at least 800° C.

3. A method in accordance with claim 1, wherein said carbonaceous solid reducing agent is contained in said melting and reducing furnace in the form of a packed bed, and said upper and lower tuyeres are located in the lower portion of said melting and reducing furnace, said preliminarily reduced ore and a flux being introduced together with air or oxygen-enriched air at elevated temperature into said melting and reducing furnace.

4. In a method for melting and refining a powdery or fine granular ore containing metal oxide comprising:
   (1) charging said ore and a reducing gas to a fluidized bed type of preliminary reducing furnace to preliminarily reduce said ore therein,
   (2) charging a powdery carbonaceus reducing agent into a preliminary treatment furnace to preliminarily treat or carbonize said reducing agent and reduced ore,
   (3) charging the preliminarily reduced ore heated at a high temperature and the preliminarily treated or carbonized reducing agent into a vertical melting and reducing furnace,
   (4) introducing air or oxygen-enriched air at elevated temperature into said melting and reducing furnace so that said ore is melted and reduced by said treated carbonaceous solid reducing agent and air or oxygen-enriched air, and
   (5) discharging molten metal and molten slag from the melting and reducing furnace,
   the improvement which comprises
   generating a first reducing gas at elevated temperature in a vertical melting and reducing furnace provided with upper and lower tuyeres,
   blowing a part of said first reducing gas discharged from said melting and reducing furnace into the preliminary reducing furnace to preliminarily reduce said ore therein and blowing another part of said reducing gas into said preliminary treatment furnace to preliminarily treat or carbonize said carbonaceous reducing agent,
   introducing the preliminarily reduced ore and the preliminarily treated carbonaceous reducing agent into said melting and reducing furnace via at least the upper of the tuyeres, and
   introducing air or oxygen-enriched air via at least the lower of the tuyeres.

5. A method in accordance with claim 4, further comprising generating a second reducing gas in the preliminary treatment furnace and blowing at least a part of said second reducing gas into the preliminary reducing furnace to preliminarily reduce said ore in combination with said first reducing gas.

6. A method in accordance with claim 4, wherein said carbonaceous solid reducing agent is powdery coal being treated by carbonizing in said preliminary treating furnace.

7. A method in accordance with claim 4, wherein said air or oxygen-enriched air is introduced into said melting and reducing furnace at a temperature of at least 800° C.

* * * * *